United States Patent [19]

Rohlin et al.

[11] 4,002,509
[45] Jan. 11, 1977

[54] PROCESS FOR THE MANUFACTURE OF A HIGH STRENGTH CHAIN AND THE PRODUCT OBTAINED THEREBY

[75] Inventors: Barbro Marie Rohlin, Sandviken; Sten Lennart Bergh, Vaxholm; Gustav Nils Herman Westerberg, Borlange, all of Sweden

[73] Assignee: Stora Kopparbergs Bergslags Aktiebolag, Falun, Sweden

[22] Filed: Dec. 22, 1975

[21] Appl. No.: 643,122

[30] Foreign Application Priority Data

Dec. 23, 1974 Sweden ............................. 7416252

[52] U.S. Cl. .................................. 148/34; 59/35 R; 59/78; 59/84; 75/126 B; 148/12 B; 148/12 F; 148/36; 148/127
[51] Int. Cl.$^2$ ............................................. C21D 9/00
[58] Field of Search ................. 59/31, 35, 27, 1, 78, 59/34, 84; 148/12 B, 12 F, 34, 36, 127; 75/126 B, 124

[56] References Cited

UNITED STATES PATENTS 3,124,929  3/1964  Kito et al. ...................... 148/127 K
3,674,570  7/1972  Hallstrom ........................ 148/12 B
3,899,368  8/1975  Waid ............................. 148/12 F X

FOREIGN PATENTS OR APPLICATIONS 1,342,235  1/1974  United Kingdom ................... 59/35

Primary Examiner—Arthur J. Steiner
Attorney, Agent, or Firm—Curtis, Morris & Safford

[57] ABSTRACT

The invention relates to a process for the manufacture of a chain having an ultimate tensile strength of at least 90 kg/mm$^2$ and an impact strength at ± 0° C of at least 2.8 kgm starting from a steel ingot containing C, Si, Mn, Cr, Mo, N, Al, Nb (Cb), and Fe in certain amounts, said ingot being hot rolled to a rod of a dimension suitable for use in a chain, cut into pieces of adjusted length and after resistance heating to 700°–900° C said pieces being bent and flash-butt welded to connected links of a chain, said chain being then normalized by heating to a temperature of 700°–900° C and then cooled in air. The invention also covers chains prepared by the process.

5 Claims, No Drawings

PROCESS FOR THE MANUFACTURE OF A HIGH STRENGTH CHAIN AND THE PRODUCT OBTAINED THEREBY

The present invention relates to a process for the preparation of steel chain, that is, a high strength chain of high toughness intended for use as an anchor chain for very big crafts, such as supertankers and floating oil drilling platforms.

With the advent of large size bulk carriers, the ever increasing size of such craft has made it necessary to increase the dimensions of anchor chains manufactured in a conventional manner to such an extent that the chain becomes difficult to handle because of size and weight. Therefore, attempts have been made to increase the strength of the chain by alloying additives and by quenching and tempering, thus striving to reduce the size of the chain. However, these attempts either result in increased raw material cost or an complicated process of manufacture, which makes the chain more expensive.

According to this invention, a high strength chain having a high impact value is manufactured by using a comparably cheap steel alloy and a method of manufacture adapted thereto. In this field "high strength" is defined as tensile tests and high impact value is defined as Charpy V tests. In this context, by "high" strength chain is meant a chain having an ultimate tensile strength of at least 90 kg/mm$^2$ and simultaneously having an impact value at ±0° C of at least 2.8 kgm.

According to the invention, the starting material is a steel ingot consisting of:

|    | % by weight | Preferably % by weight | Most preferably % by weight |
|----|-------------|------------------------|------------------------------|
| C  | 0.04 – 0.10 |                        |                              |
| Si | 0.1 – 1.2   | 0.2 – 0.8              | 0.40 – 0.60                  |
| Mn | 2.2 – 3.0   |                        | 2.3 – 2.6                    |
| Cr | 1.5 – 3.0   | 1.7 – 2.5              | 1.8 – 2.2                    |
| Mo | 0.10 – 0.60 |                        | 0.2 – 0.3                    |
| N  | 0.005 – 0.020 |                      | 0.008 – 0.015                |
| Al+/ | 0.015 – 0.10 |                     | 0.015 – 0.060                |
| Nb or V and | 0 – 0.1 |                    |                              |

Fe containing normal contaminants.

+/ acid soluble.

With acid soluble Al means the contents of aluminium in the steel except this which is bound to oxygen.

The ingot is hot rolled in the usual way at ordinary hot rolling temperatures e.g. from 1250° to 850° C lying within the austenite range to a bar of a dimension suitable for chain manufacture e.g. from $\phi$ 50 mm to $\phi$ 150. The bar which usually is allowed to cool in air while transported to the chain manufacture, is cut into pieces of preselected length which, after resistance heating to the working temperature 700° – 900° are bent and flash-butt welded to connect links in a chain.

Flash-butt welding — A resistance welding process in which an arc is struck and maintained between the joint members until welding heat is attained. The current is then shut off and the weld made by forcing the parts together.

The chain is then heated to a temperature of 700° – 900° C, preferably 750° – 860° C, and is then allowed to cool in air. This manufacture does not require any particular equipment for hardening or the like.

Some examples of the application of the invention are shown in the following Table. In said Table, samples labelled as A refer to steel ingots having the composition 0.07 % by weight of C, 2.45 % Mn, 2.10 % Cr, 0.20 % Mo, 0.06 % Al. Samples labelled as B have additionally 0.03 % Nb (Cb), whereas samples labelled as C instead of Nb (Cb) have additionally 0.09 % V. Sample D has an analysis lying just outside the defined metallurgical region of this invention, namely 0.05 % by weight of C, 0.24 % Si, 2.43 % Mn, 3.9 % Cr, 0.32 % Mo, 0.04 % Nb (Cb) and 0.090 % Al. Samples A, B and C have, in other words, a composition corresponding to the invention.

Among samples labelled as A, I has been treated according to the invention, which is not the case with II and III. All samples B and C represent alloy ingots which have been manufactured in conformity with the invention.

The ingots represented by the alloys above, have been rolled to bars having a diameter of $\phi$ 78 mm at a final rolling temperature of about 1000° C. The bars have then been bent at a temperature of about 800° C and flash-butt welded to chain links which, after cooling, have been heated to a temperature of 680° – 970° C and were then allowed to cool in air. Ultimate tensile strength in kg/mm$^2$, elongation in %, impact value in kgm and brittle transition temperature in ° C have been determined for the body of the chain link (G) and also for the weld joint (S) of the link. "Brittle transition temperature" means that temperature in ° C where the impact value, determined by a Charpy V test, is 2.8 kgm.

As is clear from the Table below, a too high heat treating temperature i.e. above 900° C in sample A II gives too low toughness i.e. less than 2.8 kgm of the weld joint, where as a too low heat treating temperature in A III i.e. less than 700° C results in a too low strength, i.e. less than 90 kg/mm$^2$ already in the body of the chain link material.

Sample D having excessively high content of Cr (greater than 3.0 %) results in too low an impact of the weld joint.

In accordance with the invention, a chain of comparable properties (a breaking load of 650,000 kg) made from conventional chain alloy of C = 0.29 % by weight, Si = 0.50 %, Mn = 1.6 % and V = 0.09 % for a length of 100 meter weighs 23,000 kg (chain diameter 100 mm), whereas according to the present invention a chain of the same properties for the same length weighs 15,000 kg (chain diameter 80 mm).

TABLE

| Sample No | Heat treating temp. ° C | Ultimate tensile strength (kg/mm$^2$) | | Elongation % | Impact value 0° C kgm | Brittle Transition temp. ° C |
|---|---|---|---|---|---|---|
| A I | 775 | G | 98 | 19 | 10 | −90 |
|     |     | S | 97 | 13 | 6  |     |
| A II | 970 | G | 112 | 14 | 4 |     |
|      |     | S | 110 | 11 | 3 |     |
| A III | 680 | G | 86 |    |   |     |
| B I | 800 | G | 99 | 18 | 16 | −100 |

TABLE-continued

| Sample No | Heat treating temp. °C | Ultimate tensile strength (kg/mm²) | | Elongation % | Impact value 0° C kgm | Brittle Transition temp. °C |
|---|---|---|---|---|---|---|
| B II | 780 | S | 94 | 12 | 4.3 | −90 |
|  |  | G | 101 | 20 | 15 |  |
| C I | 775 | S | 99 | 11 | 3.5 | −90 |
|  |  | G | 96 | 18 | 14 |  |
| C II | 800 | S | 95 | 11 | 4 | −120 |
|  |  | G | 95 | 16 | 18 |  |
| D | 765 | S | 96 | 12 | 10 |  |
|  |  | G | 95 | 14 | 15 |  |
|  |  | S |  |  | 2.5 |  |

What is claimed is:

1. In a process for the manufacture of a chain having an ultimate tensile strength of at least 90 kg/mm² and an impact value at ±0° C of at least 2.8 kgm, the improvement comprising hot rolling a steel ingot consisting essentially of:

| | | |
|---|---|---|
| C | =0.04 − 0.10 | % by weight |
| Si | =0.1 − 1.2 | % by weight |
| Mn | =2.2 − 3.0 | % by weight |
| Cr | =1.5 − 3.0 | % by weight |
| Mo | =0.10 − 0.60 | % by weight |
| N | =0.005 − 0.020 | % by weight |
| Al Acid soluble | =0.015 − 0.10 | % by weight |
| Nb or V up to | =0.1 | % by weight |
| Fe containing normal contaminants = remainder | | | to a bar of a dimension suitable for use in a chain, cutting said bar into pieces of adjusted length and resistance heating the same to 700° − 900° C, bending and flash-butt welding said pieces to connect the same into links of a chain, heat treating said chain by heating to a temperature of 700° − 900° C and then cooling the chain in air.

2. A process according to claim 1, wherein said steel consists essentially of:

| | | |
|---|---|---|
| C | = 0.04 − 0.10 | % by weight |
| Si | = 0.2 − 0.8 | " |
| Mn | = 2.2 − 3.0 | " |
| Cr | = 1.7 − 2.5 | " |
| Mo | = 0.10 − 0.60 | " |
| N | = 0.005 − 0.020 | " |
| Al acid soluble | = 0.015 − 0.10 | " |
| Nb or V up to | 0.1 | " |
| and Fe containing normal contaminants = remainder. | | |

3. A process according to claim 1, wherein said steel consists essentially of

| | | |
|---|---|---|
| G | = 0.04 − 0.10 | % by weight |
| Si | = 0.40 − 0.60 | " |
| Mn | = 2.3 − 2.6 | " |
| Cr | = 1.8 − 2.2 | " |
| Mo | = 0.20 − 0.30 | " |
| N | = 0.008 − 0.015 | " |
| Al acid soluble | = 0.015 − 0.060 | " |
| Nb or V up to | 0.1 | " |
| and Fe containing normal contaminants = remainder. | | |

4. A process according to claim 1, wherein the heat treating temperature is 750° − 860° C.

5. A chain prepared by the process as defined in claim 1.

* * * * *